United States Patent [19]

Wong

[11] Patent Number: 4,538,531

[45] Date of Patent: Sep. 3, 1985

[54] OLEFIN POLYMER BARRIER FILMS AND METHODS FOR USE THEREOF

[75] Inventor: Nang C. Wong, Fresno, Calif.

[73] Assignee: The Dow Chemical Company, Midland, Mich.

[21] Appl. No.: 517,538

[22] Filed: Jul. 27, 1983

Related U.S. Application Data

[63] Continuation-in-part of Ser. No. 401,590, Jul. 26, 1982, abandoned.

[51] Int. Cl.$^3$ ................................................ A01C 1/00
[52] U.S. Cl. ................................. 111/1; 47/DIG. 10; 47/9; 524/223; 524/232
[58] Field of Search ............................... 524/232, 223

[56] References Cited

U.S. PATENT DOCUMENTS

| | | | |
|---|---|---|---|
| 2,770,608 | 11/1956 | Barker | 524/232 |
| 2,938,879 | 5/1980 | Mock | 524/223 |
| 2,984,939 | 5/1961 | Russell | 47/9 |
| 3,176,021 | 3/1965 | Volungis | 524/231 |
| 3,252,251 | 5/1966 | Simmons | 47/9 |
| 3,393,175 | 7/1968 | Baitinger, Jr. | 524/223 |
| 3,580,196 | 5/1971 | Tobgreen | 111/1 |
| 3,821,179 | 6/1974 | Powell | 524/223 |
| 4,092,112 | 5/1978 | Calkins et al. | 21/108 |
| 4,214,054 | 7/1980 | Watanabe et al. | 524/232 |

FOREIGN PATENT DOCUMENTS

| | | | |
|---|---|---|---|
| 50-34048 | 4/1975 | Japan | 524/223 |
| 57-59939 | 4/1982 | Japan | 524/223 |
| 915589 | 1/1963 | United Kingdom . | |

Primary Examiner—Joseph L. Schofer
Assistant Examiner—Peter F. Kulkosky
Attorney, Agent, or Firm—Jonathan W. Morse; Douglas N. Deline; Michael L. Winkelman

[57] ABSTRACT

Olefin polymer films are produced comprising amounts of one or more permeability reducing fatty acid derivative compounds. The resultant films have improved barrier abilities as evidenced by reduced methyl bromide diffusion rates. The films are very suitably employed as soil fumigation tarpaulins or soil covering materials. Improved methods for confining chemical treatment agents are also taught.

10 Claims, No Drawings

OLEFIN POLYMER BARRIER FILMS AND METHODS FOR USE THEREOF

CROSS-REFERENCE TO RELATED APPLICATION

This is a continuation-in-part of copending application Ser. No. 401,590, filed July 26, 1982, now abandoned.

FIELD OF THE INVENTION

This invention relates to films made from olefin polymers. It has been found that the addition of certain derivatives of fatty acids to olefin polymer films reduces the permeability of said films. The invention also relates to methods of confining chemical treatment agents to areas of application and adjacent areas desired to be treated. The subject olefin polymer films have been found to be very suitable for confining chemical treatment agents.

BACKGROUND OF THE INVENTION

Olefin polymers films containing various types of additives are generally known in the art. One problem, however, observed in the films currently known is in achieving desired combinations of resin cost, polymer processability, film strength and film barrier ability. This problem is particularly acute in the area of films used for confinement of chemical treatment agents, and especially soil treatment tarpaulins or soil covering materials. For these and similar uses, large amounts of film are used to confine chemical treatment agents to the area where they are applied and are desired and expected to treat. The chemical treatment agents used, often very volatile gases, tend to diffuse, wash, dissolve or blow away unless prevented from doing so. The rapid loss or escape of these treating chemicals can be undesirable for several reasons. For example, (1) the chemicals may be hazardous or toxic in some way, (2) the desired treating effects may not be achieved, and/or (3) larger amounts of chemical may be required to achieve the desired effects. The problem of finding a film suitable for use as a chemical treating agent confinement film is further complicated by the fact that during usage such films are subjected to conditions and treated in a manner that punctures and tears in such films tend to occur.

The films currently used to confine chemical treatment agents and as soil treatment tarpaulins or soil covering materials are most commonly low density polyethylene films approximately one thousandth of an inch (1 mil) thick. Due primarily to their ability to resist puncturing and their ability to resist tear propagation should the film become punctured, these films are fairly well-suited for this usage. The main problem with these films, especially when used with volatile gaseous soil fumigation compounds such as methyl bromide (MeBr) and chloropicrin, is the permeation of the volatile gases through the film and out into the atmosphere. These soil fumigation substances escaping into the atmosphere, depending on their composition, can then present various types of environmental hazards. This loss of fumigant due to diffusion, unless prevented by using thicker, more expensive films, requires the application of larger doses of fumigant at a greater expense to ensure that a sufficient amount of the substance remains in the soil to achieve the desired soil treatment effects.

It is also known in the art that fatty acid amides can be added to olefin polymer films in small amounts (i.e., 0.5 percent by weight or less for non-filled films) as slip or anti-block agents making such films easier to handle and use. See, for example, U.S. Pat. Nos. 3,330,796; 3,645,822; 3,562,291; 2,770,608; 2,938,879 and 3,176,021.

It is an object of the present invention to provide novel olefin polymer films with improved barrier abilities, which films can be easily produced at low cost and are sufficiently resistant to puncturing. It is also an object of this invention to provide a method of confining a chemical treatment agent to areas of application and adjacent areas desired to be treated, which method uses for such confinement purposes olefin polymer films having good barrier abilities along with other desirable physical properties.

BRIEF SUMMARY OF THE INVENTION

According to the present invention there is provided an olefin polymer film comprising a permeability-reducing amount of one or more fatty acid derivative compounds, which film has reduced permeability to the diffusion therethrough of a gaseous chemical treatment agent due to the fatty acid derivative compound. In a preferred aspect of the present invention, the fatty acid derivative compound is a fatty acid monoamide such as stearamide.

Also according to the present invention, there is provided a method of confining a gaseous chemical treatment agent to areas of application and adjacent areas desired to be treated, which method utilizes for such confinement purposes olefin polymer barrier film comprising an effective amount of one or more of the above-described fatty acid derivative compounds.

DETAILED DESCRIPTION AND EMBODIMENTS

In general, olefin polymer resins suitable for producing films according to the present invention are well known in the art and include polymer resins containing polymerized therein a major amount of ethylene or propylene. As used herein the terms polyethylene and polypropylene refer to polymers having polymerized therein at least 50 percent by weight ethylene or propylene, respectively, preferably at least 70 percent by weight.

Films prepared from the various polyethylene resins are especially preferred in the practice of the present invention. Films made from low density polyethylene (LDPE) can be very advantageously modified according to the present invention to provide desirable barrier films. Films of linear low density polyethylene (LLDPE) (polymers of ethylene and up to about 20 percent by weight of one or more α-olefins having from 3 to 25 carbon atoms) or blends of LLDPE with high density polyethylene (HDPE) and/or with LPDE provide very desirable barrier films due to superior barrier ability and very good toughness.

It is contemplated within the scope of the present invention to use the fatty acid derivative compounds to modify the permeability of olefin polymer resin films, the polymer(s) comprising minor amounts of additional, copolymerizable monomers polymerized therein, in addition to the ethylene, the propylene, or in the case of LLDPE, the ethylene and copolymerized α-olefin monomer(s) having from 3 to 25 carbon atoms.

The essence of the present invention lies in the use of one or more permeability reducing derivatives of fatty acids to improve the barrier ability of olefin polymer films and the use of such films to contain gaseous chemical treatment agents. The fatty acids, from which derivatives suitable for the practice of the present invention are prepared, are carboxylic acids generally composed of a chain of about 6 to 24 carbon atoms (including the carboxyl group carbon). The preferred derivatives are monoamides, bisamides, amines and esters of polyhydric alcohols (polyols). The preferred groups of fatty acid derivatives from which permeability reducing compound or compounds can be selected can be represented by the following Formulas I through IV.

I. Monoamides

It has been found that monoamides according to the following formula can improve the barrier ability of olefin polymer films:

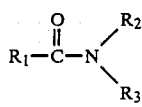
(Formula I)

wherein $R_1$ is an alkyl or alkenyl group having from 5 to 23 carbon atoms, preferably from 8 to 20 carbon atoms, $R_2$ and $R_3$ are independently a hydrogen atom, an alkyl group having from 1 to 24 carbon atoms, an alkenyl group having from 2 to 24 carbon atoms or an acyl group having 10 to 24 carbon atoms. Preferably $R_2$ and $R_3$ are hydrogen atoms. Monoamides are a particularly preferred group of fatty acid derivatives based on their cost, availability and effectiveness. Exemplary monoamides include stearamide, oleamide, and stearyl stearamide. For a further listing of some of the saturated fatty acid amides represented by this formula see U.S. Pat. No. 4,214,054, incorporated herein by reference.

In the above formula and those that follow, it is understood that the various hydrocarbon R-groups can be inertly substituted and that such substitutions do not take the fatty acid derivative compounds outside the scope of the present invention. As used herein the term "inertly substituted" means substitutions or substituent groups comprising atoms other than carbon or hydrogen which substitutions or substituent groups do not cause the inertly substituted fatty acid derivative compound to be detrimentally affected by film-producing temperatures and conditions nor do such substitutions or substituent groups otherwise cause the fatty acid derivative compounds to deleteriously effect the olefin polymer film although they might, in fact, improve the barrier or other properties of the film.

One group of monoamides from which the permeability modifying compound(s) can be selected is the group of saturated fatty acid amides which can be represented by the formula:

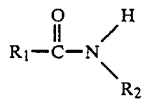
(Formula I-A)

in which formula $R_1$ is an alkyl group having from 9 to 23 carbon atoms, and $R_2$ is independently either a hydrogen atom or an alkyl group having from 1 to 24 carbon atoms.

Amides according to the above Formula I-A are exemplified by, but not limited to, stearyl stearamide and stearamide. Saturated amides suitable for the practice of the present invention, such as stearyl stearamide and stearamide, are, in general, commercially available. For example, stearamide sold under the trade name Kemamide ®S and stearyl stearamide sold under the trade name Kemamide ®S-180, are commercially available from the Humko Chemical Division of Witco Chemical Corporation, Memphis, Tenn.

II. Bisamides

Bisamides selected from the group of compounds represented by the following Formulas II and II-A can also improve the barrier ability of olefin polymer films.

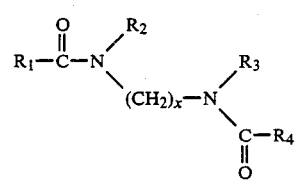
(Formula II)

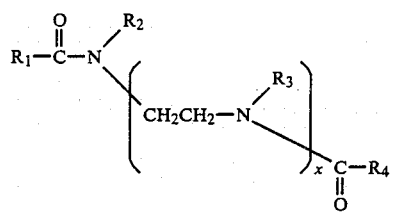
(Formula II-A)

wherein $R_1$ and $R_4$ are independently either an alkyl or alkenyl group having 5 to 23 carbon atoms, $R_2$ and $R_3$ are independently either a hydrogen atom, an alkyl group having 1 to 24 carbon atoms or an acyl group having 10 to 24 carbon atoms and X is an integer from 1 to 6.

Examples of some fatty acid bisamides include N,N'-ethylene bislauramide, N,N'-ethylene bisstearamide and the like.

III. Fatty Acid Amines

According to the present invention fatty acid amines selected from the group of compounds represented by the following formula can be used to improve the barrier ability of olefin polymer films.

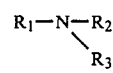
(Formula III)

wherein $R_1$ is an alkyl or alkenyl group having from 10 to 24 carbon atoms and $R_2$ and $R_3$ are independently a hydrogen atom, an alkyl group having from 1 to 24 carbon atoms, or a substituent containing a group of the formula $-R_4O-_m$, wherein $R_4$ is an alkylene group having from 1 to 5 carbon atoms and m is an integer from 1 to 10.

Fatty acid amines suitable for the practice of the present invention are generally known and commercially available. Exemplary fatty acid amines include stearamine and many others. See U.S. Pat. No. 4,214,054 for a further listing of saturated fatty acid amines.

IV. Fatty Acid Esters of Polyols

It has also been found that partial and complete fatty acid esters of polyols (polyhydric alcohols) selected from the group of compounds represented by the following formula can be used to improve the barrier ability of olefin polymer films.

$$[R_1—OR_2—_kO]_lZ \qquad \text{(Formula IV)}$$

wherein Z is the residue of a polyhydric alcohol having l hydroxy groups with l being an integer of from 2 to 8, $R_1$ is independently an acyl group having from 9 to 23 carbon atoms or hydrogen wherein the number of hydrogen $R_1$ groups is from 0 to l-1, $R_2$ is an alkylene group having from 1 to 5 carbon atoms and k is an integer from 0 to 7.

Examples of such compounds include glycerol monostearate and sorbitan monostearate and the like. For a further listing of such fatty acid esters of polyols see U.S. Pat. No. 4,214,054, which has been incorporated by reference, and U.S. Pat. No. 3,644,230, which is hereby incorporated herein by reference.

Though not intending to limit the scope of the invention, it is theorized that the described compound(s) migrate to the surface of the olefin polymer film to create a thin layer which serves as the barrier to permeating or diffusing gases. Therefore, according to the present invention, enough of the selected compound or compounds which is sufficient to create this layer is added to the olefin polymer, greater amounts not further improving barrier ability noticeably.

It has been found that amounts of the above-described fatty acid derivative compounds up to about 5 percent by weight based on the total weight of the olefin polymer plus selected compound(s) continue to improve the barrier ability of such polymer films. It is, however, known in the art to use up to about 0.5 percent by weight of some fatty acid monoamide compounds as slip and/or anti-block agents in polyethylene and polypropylene films not containing fillers or pigments. It is also known to use up to about 1.25 percent by weight of some fatty acid monoamide compounds in polyethylene films (up to about 2 percent by weight in polypropylene films) as slip and/or anti-block agents when the films contain filler and/or pigments. Therefore, the presently claimed films involve (a) the use of greater than 0.5 percent by weight fatty acid monoamide in films of polyethylene and polypropylene containing essentially no filler or pigment, (b) the use of greater than 1.25 percent by weight fatty acid monoamide in polyethylene films containing a filler or pigment, (c) the use of greater than 2 percent by weight fatty acid monoamide in polypropylene films containing a filler or pigment and (d) the use of a permeability reducing amount of the other types of fatty acid derivative compounds in polyethylene or polypropylene films with or without filler and/or pigment. The above and following weight percentages are based on the total weight of (a) olefin polymer, (b) filler/pigment (if any) and (c) fatty acid derivative compound in the olefin polymer films.

It has been found preferable in polyethylene films containing essentially no filler or pigment to use greater than 0.5 percent by weight of fatty acid derivative compound(s), more preferable to use greater than about 1 percent by weight and most preferable to use greater than 1.25 percent by weight. In polypropylene films containing essentially no filler or pigment it is desirable to use greater than 0.5 percent by weight of fatty acid derivative compound(s), more desirable to use greater than about 1 percent by weight and most desirable to use greater than 2 percent by weight.

While olefin polymer films pursuant to the present invention containing more than 5 percent by weight fatty acid derivative compound have reduced permeability to the diffusion of gases such as MeBr, adding amounts greater than 5 percent by weight does not improve the barrier ability of the film substantially more than the addition of 5 percent by weight does. Moreover, amounts greater than 5 percent by weight can cause the resin/modifier mixture to be hard to process and form into a film, especially by blown film techniques. Therefore, it is desirable to use amounts of fatty acid derivative compound(s) of about 5 percent by weight or less in olefin polymer films and more desirable, especially in the case of polyethylene films, to use about 2 percent by weight or less.

For the purpose of claiming the films according to the present invention, the films are viewed as comprising the olefin polymer resin and an additive package. As used herein, "additive package" describes (a) the amount and type of fatty acid derivative compound(s) and (b) whether or not the claimed film contains a filler and/or pigment. In general, a film is deemed to contain a filler if there is present in the film more than 10 percent by weight of filler compound(s) and deemed to contain a pigment if there is present in the film more than 1 percent by weight of the pigment compound(s). The terms "filler" and "pigment" are well known in the art and include materials such as carbon black, titanium dioxide, calcium carbonate, mica and the like.

It has been found that the fatty acid derivative compound(s) surprisingly reduce the rate of diffusion of gaseous chemical treatment agents such as MeBr through olefin polymer films by more than 10 percent, oftentimes more than 20 percent and in some cases more than 25 percent, compared to the same olefin polymer film not containing any fatty acid derivative compound. The reduction in gaseous chemical treatment agent diffusion, with little or no loss of the physical properties nor increase in film cost allows a reduction in the amount of treatment agent which is required to be applied. This reduction in chemical treatment agent of course results in reduced costs for the overall chemical treatment process as well as other benefits.

The selected compound(s) may be incorporated in the olefin polymer by any of the methods known in the art to be suitable for insuring a uniform mixture of olefin polymer and additive in the final fabricated article. Suitable methods include addition of the compound(s) as a solid, in solution or in the form of a slurry in water or other non-solvent, to the olefin polymer in powder or granule form followed by drying, if necessary, and tumbling. The fatty acid derivative(s) may also be incorporated in the olefin polymer by melt blending the ingredients in a conventional apparatus such as by being pumped into an extruder which is being used to prepare a film or by other mixing means such as a Banbury Mixer, heated rolls, a plasticator or a fluted liner extruder. A concentrate of the compound(s) in olefin polymer can be made by one of the aforesaid methods and this, in turn, can be blended with olefin polymer by tumbling or other suitable means. Finally, various combinations of the above methods can be used.

The method and apparatus for producing films according to the present invention, and for producing films suitable for chemical treatment agent confinement usage, from olefin polymer resins are well known in the art. See for example, U.S. Pat. Nos. 3,976,733 and 4,025,253. Also known are the so-called "mesh" films which are particularly advantageous films for the practice of the present invention and methods and apparatus for producing such mesh-type films. In the production of mesh-type films, differential cooling of the extruded film surface causes ribs or areas of greater thickness that reinforce the film allowing overall film thicknesses to be generally reduced. See for example, U.S. Pat. No. 4,315,963.

Films according to the present invention can vary in average thickness depending on their intended usage. The films used for confining chemical treatment agents generally have average thicknesses of up to about 10 mils. Most soil fumigation tarpaulins generally have average thicknesses of less than about 5 mils and usually from about 0.75 to about 1.5 mils.

In addition to the above-described additive packages, films according to the present invention may also contain various other additives which are known in the art, such as stabilizers and anti-oxidants; as long as such additives are not detrimental to film performance (i.e., toughness and barrier ability). It is sometimes preferable that the films according to the present invention, when used for mulch film purposes as well as chemical treatment agent confinement, contain only such fillers and pigments that cause the films to be black or dark colored. In this aspect, films containing white-colored pigments or fillers such as titanium dioxide are sometimes less preferable.

In one aspect, the present invention involves a method of confining a chemical treatment agent to areas of application and adjacent areas desired to be treated, which method utilizes for such confinement purposes olefin polymer film containing one or more of the above-described fatty acid derivative compounds. The olefin polymer film used in this method comprises a permeability-reducing amount of one or more of the above-described compounds, depending on the amount that the inherent barrier ability of the particular olefin polymer needs to be improved to produce a film having the desired amount of barrier ability. It has been found that the fatty acid derivative compounds surprisingly reduce the amounts of a gaseous chemical treatment agent such as methyl bromide lost into the atmosphere through the film and prevent potential harm due to such escaped treatment agent.

As used herein, the term "chemical treatment agent" generally means any chemical or substance that can be applied to or in any way contacted with a specific area and/or material or organism located in that area for the purpose of achieving various desired effects. By the terms "confining a chemical treatment agent to its areas of application and adjacent areas desired to be treated" it is meant that chemical treatment agents which are volatile, soluble and/or dust-like in nature and, therefore, may tend to diffuse, dissolve and/or blow away, are intended to be prevented or hindered from leaving said area in such manners. The rapid loss or escape of the treating chemicals can be undesirable because (1) the chemicals may be hazardous or toxic in some way, (2) the desired treating effects may not be achieved, and/or (3) larger amounts of chemical may be required to achieve the desired effects.

The films of concern in the present invention have been found particularly useful as soil treatment tarpaulins. By "soil treatment" it is generally meant the use of various chemical soil treatment agents, applied to the surface of soil or incorporated into the soil at various depths below the surface for the purpose of achieving various desired effects. Due to the barrier ability of the films claimed herein, and the other good physical properties of olefin polymer films, the present invention has been found particularly useful in confining volatile gaseous chemical soil treatment agents or soil fumigants often used to erradicate or reduce soil-contained pathogens such as bacteria or fungi in order to prepare soil for planting or treat areas for existing diseases or infestations. After these chemicals are injected into or otherwise applied to the soil, the areas so treated are quickly covered by a tarpaulin preventing the escape of the gaseous materials and maintaining a constant effective concentration in the area desired to be treated. Methyl bromide and chloropicrin, for example, are gaseous chemical treatment agents commonly used for these purposes. It is contemplated that other types of gaseous chemical treatment agents are also suitable for use with the films according to the present invention in the claimed methods.

Another aspect of the present invention involves the use of the above-described olefin polymer films containing fatty acid derivative(s) and the above-described method of confining a gaseous chemical treatment agent to enclose buildings or structures that are being treated with a gaseous fumigant. A further aspect of the present invention contemplates that the film may be useful in situations where the "application of the chemical treatment agent" is a naturally occurring process. In some cases chemical substances may be naturally occurring or created by natural causes in the soil and those substances, due to various beneficial results, are desired to be retained and concentrated in or near the originating area. In such cases, the present barrier film and method of confining a gaseous chemical treatment agent may be advantageously employed to prevent the escape of such substances.

It should be noted that unlike films not containing fatty acid derivative compound(s), films according to the present invention surprisingly become more resistant to the diffusion therethrough of gaseous chemical treatment agent after undergoing several cycles of heating to about 50° C. and cooling to about 30° C. Heating and cooling cycles are typically encountered by fumigation tarps when they are applied outdoors and undergo heating during the day and cooling at night.

EXAMPLES

In the following examples the following resins are used to prepare control and/or example films.

| Resin | Density g/cc | Melt Index g/10 min. |
| --- | --- | --- |
| LDPE 1 | 0.9245 | 1.90 |
| LDPE 2 | 0.9220 | 1.15 |
| LDPE 3 | 0.9215 | 2.00 |
| LDPE 4 | 0.92 | 2.3 |
| HDPE | 0.965 | 0.7 |
| LLDPE 1 | 0.917 | 2.3 |
| LLDPE 2 | 0.926 | 2.0 |
| LLDPE 3 | 0.930 | 0.8 |

Example Films 1–4—Monoamide Additives in LDPE

Example films 1 through 4 are made using the amide additives and amounts specified in Table I, below. These additives are dry blended with LDPE 4, a low density polyethylene resin having a melt index of 2.3 grams per 10 minutes and a density of 0.92 grams per cubic centimeter. This mixture is then extruded through a 1 inch Killion mini-blown film line and film samples 1 through 4 thereby produced. The temperature of the hopper zone into which the mixture is loaded is about 70° F. The barrel temperature ranges from 200° to 350° F. with the die being at 350° F. The die circumference is about 2 inches, the die gap is about 0.035 inch, and the blow up ratio is about 2 to 2.5, producing a film about 1 mil thick. Table I below summarizes the additives and the amounts of such additives employed in the production of example films 1 through 4.

The tables below also summarize the rates at which methyl bromide diffuses through samples of each of the example films. The methyl bromide diffusion rates for the example films are determined by a method which approximates soil treatment conditions. The method is described in an article by M. J. Kolbezen and F. J. Abu-El-Haj published in the "Proceedings of the International Agricultural Plastics Congress 1977" at pages 476 to 481, which teaching are incorporated herein by reference.

In this method, a 10 cm by 40 cm sample of the film to be tested, is used to divide a small chamber in half. The two separate chamber portions, both at approximately atmospheric pressure, therefore, share the film as a common wall, one chamber simulating the atmosphere between the soil treatment tarpaulin and the soil (known as the "soil side" chamber), the other chamber representing atmospheric conditions above the soil treatment tarpaulin. Into and through the "soil side" chamber is passed a continuous stream of air containing a constant known concentration of methyl bromide. Into and through the other chamber is passed a continuous stream of air containing no methyl bromide, which stream then picks up the methyl bromide that diffuses through the film sample. The amount of diffused methyl bromide is then measured by gas chromatography and the rate of diffusion for the particular film determined or the permeability of the specific resin/modifier combination (independent of film thickness) determined. The diffusion rate is given in milliliters of methyl bromide per hour per square meter of film per milliliter of methyl bromide per liter of air in the atmosphere under the film (ml/hr/m$^2$/(ml/l)) at 50° C. and standard atmospheric pressure. The permeability is given in milliliters of methyl bromide per hour per square meter of film per mil of film thickness per milliliter of methyl bromide per liter of air in the atmosphere under the film (ml/hr/m$^2$/mil/(ml/l)) at 50° C. and standard atmospheric pressure. The whole apparatus can be maintained at various different temperatures to observe the effect of temperature on the barrier ability of the film.

The average methyl bromide diffusion rate for film having a particular polymer/modifier composition is determined on the basis of tests run on 2 or 3 samples of that particular film. The diffusion rate for each sample is determined at 30° C., the temperature raised to 50° C. and the rate determined, the temperature lowered to 30° and the rate determined and so on for 2 or 3 heating/cooling cycles for each sample. The average methyl bromide diffusion rate for each composition for each temperature (30° or 50°) is then calculated based on all the diffusion rates at that temperature for all of the samples of that particular composition.

The temperatures (30° C. and 50° C.) and the cyclic heating and cooling are used to approximate actual soil treatment tarpaulin usage conditions. It should be noted that the barrier ability of the modified films is observed to improve after each of the heating/cooling cycles.

TABLE I

MONOAMIDE-MODIFIED BARRIER FILMS

| | Control 1* | 1 | 2 | 3 | 4 |
|---|---|---|---|---|---|
| Amide Additive | | | | | |
| Amount[1] | 0 | 1 pph | 2 pph | 1 pph | 2 pph |
| Type | — | Stearamide[2] | Stearamide[2] | Stearyl Stearamide[3] | Stearyl Stearamide[3] |
| Average Methyl Bromide Diffusion Rate in ml MeBr/hr/m$^2$/(ml/l) | | | | | |
| at 30° C. | 10.8 | 4.0 | 3.0 | 9.4 | 7.2 |
| at 50° C. | 22.2 | 8.3 | 6.0 | 19.3 | 16.2 |
| % Reduction in MeBr Diffusion[4] | | | | | |
| at 30° C. | — | 62.8% | 72.5% | 12.7% | 33.1% |
| at 50° C. | — | 62.7% | 73.0% | 12.9% | 27.0% |

*Unmodified low density polyethylene, not an example of the present invention.
[1] Amount of amide additive in film composition in parts amide per 100 parts olefin polymer resin.
[2] Kemamide ® S brand stearamide.
[3] Kemamide ® S-180 brand stearyl stearamide.
[4] % Reduction = $\frac{a - b}{a} \times 100$;

wherein a is the diffusion rate of unmodified PE film and b is the diffusion rate of modified PE film.

Example Films 5–8—Monoamide Additives in Polyethylene Blend Films

Tables II and III below summarize the benefits obtainable in using stearamide to modify films made from blends of various olefin polymers.

The ingredients specified below are used to produce 1 mil films with a conventional single-layer, blown film apparatus. Control Film 2 is a polyethylene film made from a blend of 60% by weight LDPE 1 polyethylene resin and 40% LLDPE 1. In Example Films 5 and 6, a mixture of Kemamide S ® brand stearamide (25%) and LDPE 3 (75%) is added in place of some of the of LDPE 1 to produce an amide-modified film having a resin composition similar to that of Control Film 2, with stearamide concentrations of 1 and 2 percent, respectively, based on weight of the blend composition. The tear strengths of Control Film 2, about 160 gm/mil in the machine direction and 440 gm/mil in the transverse direction, remain about the same in Example Films 5 and 6 after addition of the stearamide. Table II below shows the improvement in barrier ability due to the stearamide.

TABLE II

Monoamide-Modified Barrier Films

| | Control 2* | 5 | 6 |
|---|---|---|---|
| Film Composition | | | |
| Olefin | 60% LDPE 1 | 59% LDPE 1 & 3 | 58% LDPE 1 & 3 |
| Polymer[1] | 40% LLDPE 1 | 40% LLDPE 1 | 40% LLDPE 1 |
| Stearamide Additive[2] | None | 1% | 2% |
| Average Methyl Bromide | | | |

TABLE II-continued

Monoamide-Modified Barrier Films

|  | Control 2* | Example Film No. 5 | Example Film No. 6 |
|---|---|---|---|
| Permeability in ml/hr/m²/mil/(ml/l) | | | |
| at 30° C. | 17.2 | 4.9 | 3.3 |
| at 50° C. | 26.2 | 7.6 | 6.1 |
| % Reduction in MeBr Permeability[3] | | | |
| at 30° C. | — | 71.5% | 80.8% |
| at 50° C. | — | 71.0% | 76.7% |

*Unmodified olefin polymer film, not an example of the present invention.
[1] Weight percent olefin polymer in film composition based on total weight olefin polymer resins and stearamide modifier.
[2] Weight percent Kemamide S ® brand stearamide in film composition based on total weight olefin polymer resins and stearamide modifier.
[3] % Reduction = $\frac{a - b}{2} \times 100$;
wherein a is the permeability of the unmodified PE and b is the permeability of the modified PE.

Control Film 3 is a blend of the following amounts of the indicated resins: 10% HDPE; 10% LDPE 2, 40% LLDPE 3, and 40% LLDPE 2. Table III, below, shows the improvement in barrier ability when the above-described Kemamide S ® mixture is used in place of some of the LDPE 2 to make Example Films 7 and 8. The tear strengths of control Film 3, 60 gm/mil in the machine direction and 716 gm/mil in the transverse direction remain about the same after the addition of the stearamide.

TABLE III

|  | Control 3 | Example Film No. 7 | Example Film No. 8 |
|---|---|---|---|
| Film Composition | | | |
| Olefin Polymer[1] | 10% HDPE<br>10% LDPE 2<br>80% LLDPE | 10% HDPE<br>9% LDPE 2 & 3<br>80% LLDPE | 10% HDPE<br>8% LDPE 2 & 3<br>80% LLDPE |
| Stearamide Additive[2] | None | 1% | 2% |
| Average Methyl Bromide Permeability in ml/hr/m²/mil/(ml/l) | | | |
| at 30° C. | 6.5 | 6.1 | 4.3 |
| at 50° C. | 11.4 | 11.2 | 8.4 |
| % Reduction in MeBr Permeability[3] | | | |
| at 30° C. | — | 6.2% | 33.8% |
| at 50° C. | — | 1.8% | 26.3% |

*Unmodified olefin polymer film, not an example of the present invention.
[1] Weight percent olefin polymer in film composition based on total weight olefin polymer resins and stearamide modifier.
[2] Weight percent Kemamide S ® brand stearamide in film composition based on total weight olefin polymer resins and stearamide modifier.
[3] % Reduction = $\frac{a - b}{2} \times 100$;
wherein a is the permeability of the unmodified PE and b is the permeability of the modified PE.

From Tables I through III above, it is clearly observable that the stearamide and stearyl stearamide improve the barrier ability of olefin polymers at 30° and 50° C. In the practice of the present invention, the additives can be advantageously combined with olefin polymer resins having desirable combinations of cost, processability, and toughness to produce very desirable barrier films. Such films are especially suited for use as soil fumigation tarps or soil covering materials.

Examples Films 9–12—Other Fatty Acid Derivative Additives

Example films 9–12 and Control 4 are made from LDPE 4 and contain the fatty acid derivative additives and amounts specified in Table IV below. These films are prepared by a process similar to that used to prepare Example films 1–8 and Controls 1–3 and evaluated in the same manner. As is shown in Table IV below, the specified fatty acid derivative additives also improve the barrier ability of the olefin polymer films to methyl bromide diffusion.

TABLE IV

Additional Fatty Acid Derivative Additives

|  | Control 4* | Example Film Number 9 | 10 | 11 | 12 |
|---|---|---|---|---|---|
| Film Gauge | 1.05 | 0.89 | 0.89 | 1.02 | 0.93 |
| Additive (type) | — | Glycerol monostearate[2] (partial ester) | Sorbitan monostearate[3] (partial ester) | Stearamine[4] (amine) | N,N'—ethylene bislauramide[5] (bisamide) |
| Amount[1] | 0 | 2 pph | 2 pph | 2 pph | 2 pph |
| Average Methyl Bromide Permeability in Ml MeBr/hr/m²/mil/(ml/l) | | | | | |
| at 30° C. | 15.2 | 7.0 | 6.9 | 7.8 | 6.4 |
| at 50° C. | 21.8 | 22.4 | 16.3 | 19.8 | 12.8 |
| % Reduction in MeBr Permeability[6] | | | | | |
| at 30° C. | — | 53.9% | 54.6% | 48.7% | 57.9% |
| at 50° C. | — | 2.8% | 25.2% | 9.2% | 41.3% |

*Not an example of the present invention.
[1] Amount of additive in film composition in parts additive per 100 parts olefin polymer resin.
[2] Aldo ® MSD brand glycerol monostearate commercially available from Glyco Chemicals.
[3] Span ® 60 brand sorbitan monostearate commercially available from ICI Americas.
[4] Kemamide ® 990 brand stearamine commercially available from Humko Chemical.
[5] Kemamide ® W-50 brand N,N'—ethylene bislauramide commercially available from Humko Chemical.
[6] % Reduction = $\frac{a - b}{2} \times 100$;
wherein a is the permeability of the unmodified PE and b is the permeability of the modified PE.

As can be seen in Table IV above, the addition of the specified compounds improves the barrier ability of the olefin polymer film to the diffusion of MeBr therethrough. This makes such films particularly desirable for use in applications where gaseous fumigants such as MeBr are desired to be retained in an area which is desired to be treated.

As is apparent from the foregoing specification, the present invention is susceptible to being embodied with various alterations and modifications which may differ particularly from those that have been described in the preceding specification and description. For this reason, it is to be fully understood that all of the foregoing is intended to be merely illustrative and is not to be construed or interpreted or restrictive or otherwise limiting of the present invention excepting as it is set forth and defined in the hereto-appended claims.

What is claimed is:

1. A method of confining a volatile gaseous fumigation compound to areas of application and adjacent areas desired to be treated, which method utilizes for such purposes an olefin polymer film selected from the group consisting of polypropylene, low density polyethylene ("LDPE"), linear low density polyethylene ("LLDPE"), blends of LPDE with LLDPE, blends of high density polyethylene ("HDPE") with LLDPE and blends of HDPE and LDPE with LLDPE, the blends having a majority of LDPE or LLDPE, the olefin polymer film comprising a derivative compound of a fatty acid, the fatty acid having 12 to 24 carbon atoms, selected from the group consisting of fatty acid monoamides, fatty acid bisamides, fatty acid amines and fatty acid esters of polyols, present in an amount such that the diffusion of the volatile gaseous soil fumigation compound through the olefin polymer film is reduced by at least 10 percent compared to the same olefin polymer film not containing such fatty acid derivative compounds.

2. A method according to claim 1 wherein the olefin polymer film comprises at least 0.5 percent by weight fatty acid derivative compound.

3. A method according to claim 1 wherein the olefin polymer film comprises from about 0.5 to about 5 percent by weight fatty acid derivative compound.

4. A method according to claim 1 wherein the olefin polymer film comprises about 1 to about 2 percent by weight fatty acid derivative compound.

5. A method according to claim 1 wherein the fatty acid derivative compound is a fatty acid monoamide.

6. A method according to claim 5 wherein the fatty acid monoamide is stearamide.

7. A method according to claim 5 wherein the fatty acid monoamide is stearyl stearamide.

8. A method according to claim 1 wherein the volatile gaseous soil fumigation compound is applied to soil areas.

9. A method according to claim 8 wherein the volatile gaseous soil fumigation compound comprises methyl bromide.

10. A method according to claim 1 wherein the olefin polymer film has a mesh-type structure.

* * * * *

UNITED STATES PATENT AND TRADEMARK OFFICE
CERTIFICATE OF CORRECTION

PATENT NO. : 4,538,531
DATED : Sep. 3, 1985
INVENTOR(S) : Nang C. Wong

It is certified that error appears in the above-identified patent and that said Letters Patent is hereby corrected as shown below:

Col. 1, line 23, "polymers" should read --polymer--.
Col. 2, line 56, "LPDE" should read --LDPE--.
Col. 4, line 56, "$—R_4O—_m$" should read --$(R_4O)_m$--.
Col. 5, line 5, "$[R_1—OR_2—_kO]_{\ell}Z$" should read
--$[R_1(OR_2)_kO]_{\ell}Z$--.
Col. 5, line 8, "1 hydroxy groups with 1 being" should read --$\ell$ hydroxy groups with $\ell$ being --; and on line 11 "$1-1,R_2$" should read --$\ell-1, R_2$--.
Col. 11, line 19, "3% Reduction $=\frac{a-b}{2}$ X 100" should read
--3% Reduction $=\frac{a-b}{a}$ X 100--.
Col. 11, about line 63 (Table IV), "6% Reduction $=\frac{a-b}{2}$ X 100" should read --6% Reduction $=\frac{a-b}{a}$ X 100--.
Col. 12, line 17, "3% Reduction $=\frac{a-b}{2}$ X 100" should read
--3% Reduction $=\frac{a-b}{a}$ X 100--.
Col. 13, line 22, "LPDE" should read --LDPE--.

Signed and Sealed this

Fourth Day of March 1986

[SEAL]

Attest:

DONALD J. QUIGG

Attesting Officer

Commissioner of Patents and Trademarks